US012734622B2

(12) United States Patent
Sun et al.

(10) Patent No.: US 12,734,622 B2
(45) Date of Patent: Sep. 15, 2026

(54) TIGHTENING APPARATUS, AND CONTROL METHOD AND CONTROL DEVICE APPLIED TO TIGHTENING APPARATUS

(71) Applicant: CONTEMPORARY AMPEREX TECHNOLOGY (HONG KONG) LIMITED, Hong Kong (CN)

(72) Inventors: Yanlin Sun, Ningde (CN); Lei Luo, Ningde (CN); Fangyuan Gu, Ningde (CN); Jin Dong, Ningde (CN); Wang Long, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 337 days.

(21) Appl. No.: 18/603,111

(22) Filed: Mar. 12, 2024

(65) Prior Publication Data

US 2024/0227096 A1 Jul. 11, 2024

Related U.S. Application Data

(63) Continuation of application No. PCT/CN2023/071815, filed on Jan. 11, 2023.

(51) Int. Cl.
*B23P 19/06* (2006.01)
*G06T 7/70* (2017.01)
*H01M 50/262* (2021.01)

(52) U.S. Cl.
CPC ................ *B23P 19/06* (2013.01); *G06T 7/70* (2017.01); *H01M 50/262* (2021.01)

(58) Field of Classification Search
CPC ............ B23P 19/06; G06T 7/70; H01M 5/262
See application file for complete search history.

(56) References Cited

U.S. PATENT DOCUMENTS 7,930,955 B2 4/2011 Miyamoto
2016/0375532 A1 12/2016 Sasaki

FOREIGN PATENT DOCUMENTS

CN 202142358 U 2/2012
CN 103259112 A 8/2013
(Continued)

OTHER PUBLICATIONS

International Search Report for PCT application No. PCT/CN2023/071815, dated Oct. 7, 2023.

(Continued)

*Primary Examiner* — Mohammad Ali
(74) *Attorney, Agent, or Firm* — Ladas & Parry LLP

(57) ABSTRACT

A tightening apparatus and a control method for the tightening apparatus are provided. The tightening apparatus includes a mounting main body and a plurality of tightening mechanisms provided on the mounting main body. Each of the tightening mechanisms includes: a tightening actuation module, configured to tighten a fastener into a mounting hole along an axis in a first direction; a visual positioning module, configured to collect image information of the fastener located in the mounting hole, determine positioning information of the fastener based on the image information, and determine second-direction position compensation information and third-direction position compensation information of the tightening actuation module based on the positioning information; a second-direction driving mechanism, configured to drive the tightening actuation module to move in a second direction based; and a third-direction driving mechanism, configured to drive the tightening actuation module to move in a third direction.

18 Claims, 9 Drawing Sheets

(56) References Cited

FOREIGN PATENT DOCUMENTS

| | | | |
|---|---|---|---|
| CN | 103586679 | A | 2/2014 |
| CN | 104551629 | A | 4/2015 |
| CN | 106625090 | A | 5/2017 |
| CN | 207139234 | U | 3/2018 |
| CN | 110961898 | A | 4/2020 |
| CN | 111113152 | A | 5/2020 |
| CN | 212470460 | U | 2/2021 |
| CN | 212886107 | U | 4/2021 |
| CN | 214069383 | U | 8/2021 |
| CN | 113977250 | B | 6/2022 |
| CN | 216706613 | U | 6/2022 |
| CN | 217045356 | U | 7/2022 |
| EP | 3437802 | A1 | 2/2019 |
| EP | 3563969 | A1 | 11/2019 |
| KR | 101282059 | B1 | 7/2013 |

OTHER PUBLICATIONS

Extended European Search Report for EP application No. 23832937.9, dated Jun. 9, 2024.

First Office Action of CN application No. 202380012008.7, dated May 16, 2026.

900

TIGHTENING APPARATUS, AND CONTROL METHOD AND CONTROL DEVICE APPLIED TO TIGHTENING APPARATUS

CROSS REFERENCE TO RELATED APPLICATION

This application is a continuation of International Patent Application No. PCT/CN2023/071815, filed on Jan. 11, 2023, which is incorporated by reference in its entirety.

TECHNICAL FIELD

The present disclosure relates to the technical field of production and assembly, in particular to a tightening apparatus, a control method and control device applied to a tightening apparatus, an electronic apparatus, a computer-readable storage medium, and a computer program product.

BACKGROUND

With the rapid development of the battery industry in recent years, there is an increasing requirement for automated production apparatuses for batteries, and the requirements for manufacturing efficiency and quality are increasingly stringent. During the automated production and assembly of batteries, it is often necessary to use a tightening apparatus to synchronously tighten multiple fasteners (e.g., bolts or screws) into corresponding mounting holes, and the defective rate of the production process will directly affect the production efficiency and production quality of the batteries.

SUMMARY

The present disclosure aims to solve at least one of the technical problems existing in the related art. Therefore, an object of the present disclosure is to provide a tightening apparatus, a control method and a control device applied to a tightening apparatus, an electronic apparatus, a computer-readable storage medium, and a computer program product, in order to reduce the defective rate of tightening fasteners by means of a tightening apparatus to improve the production efficiency and production quality of products.

According to an aspect of the present disclosure, a tightening apparatus is provided. The tightening apparatus comprises a mounting main body and a plurality of tightening mechanisms provided on the mounting main body, wherein each of the tightening mechanisms comprises: a tightening actuation module, which is configured to tighten a fastener into a mounting hole along an axis in a first direction; a visual positioning module, which is configured to collect image information of the fastener located in the mounting hole, determine positioning information of the fastener based on the image information, and determine second-direction position compensation information and third-direction position compensation information of the tightening actuation module based on the positioning information; a second-direction driving mechanism, which is configured to drive the tightening actuation module to move in a second direction based on the second-direction position compensation information; and a third-direction driving mechanism, which is configured to drive the tightening actuation module to move in a third direction based on the third-direction position compensation information; wherein the second direction, the third direction and the first direction are orthogonal to each other.

When multiple fasteners have large positional deviations after positioning or pre-fixing, the visual positioning modules can determine the positioning information of the fasteners based on the image information of the fasteners and then determine the second-direction position compensation information and the third-direction position compensation information of the tightening actuation module based on the positioning information, and the second-direction driving mechanisms and the third-direction driving mechanisms can drive the tightening actuation modules to move in the respective directions based on the compensation information in the respective directions, such that the tightening actuation modules are adjusted to appropriate positions and then accurately aligned to the fasteners. Since the multiple tightening actuation modules of the tightening apparatus can be accurately aligned to the respective fasteners, the defective rate of multi-axis synchronous tightening of the tightening apparatus can be reduced, thereby improving the production efficiency and production quality of products. In addition, when the mounting positions of the multiple fasteners change with the product type or product specification, the tightening apparatus according to the embodiments of the present disclosure can meet the requirement for multi-axis synchronous tightening of the product, has good compatibility, and can thus reduce the service cost of the apparatus.

In some embodiments, the second direction is a horizontal direction, the third direction is a horizontal direction, the first direction is a vertical direction, and the image information is high-angle shot image information of the head of the fastener. In this way, the image information contains a regular and clear contour pattern, which is convenient for rapid and accurate determination of the positioning information of the fastener.

In some embodiments, the second-direction driving mechanism comprises: a first driving device, a first lead screw extending in the second direction and driven by the first driving device to rotate, a first guide rail extending in the second direction, and a first slider slidably fitted with the first guide rail and driven by the first lead screw to move in the second direction; and the third-direction driving mechanism is arranged on the first slider and comprises: a second driving device, a second lead screw extending in the third direction and driven by the second driving device to rotate, a second guide rail extending in the third direction, and a second slider slidably fitted with the second guide rail and driven by the second lead screw to move in the third direction, wherein the tightening actuation module is arranged on the second slider.

The design according to this embodiment can provide reliable mechanical transmission for the movement of the tightening actuation module in the second direction and in the third direction, which is conducive to improving the accuracy of position compensation adjustment of the tightening actuation module.

In some embodiments, the first driving device and the second driving device are each a servo motor. The servo motor has the advantages of high control precision, low-speed operation stability, good torque-frequency characteristics, etc.

In some embodiments, the tightening actuation module comprises: a mounting base plate fixedly connected to the second slider; a third driving device fixedly connected to the mounting base plate; a third guide rail fixedly connected to the mounting base plate and extending in the first direction; a third slider slidably fitted with the third guide rail and driven by the third driving device to move in the first direction; and an electric tightening device fixedly connected to the third slider and configured to tighten the fastener into the mounting hole along the axis in the first direction.

By means of controlling the third driving device, the third slider and the electric tightening device can be controlled to move a certain distance in the first direction at an appropriate speed, so that a bit of the electric tightening device can carry out a tightening action, achieving high reliability and precision of mechanical transmission.

In some embodiments, the third driving device is a pneumatic cylinder. Since the third driving device is a pneumatic cylinder, it has a simple structure and is easy for installation and maintenance.

In some embodiments, the electric tightening device comprises: a main body portion; a bit; and an insulating adapter, which is arranged between the main body portion and the bit and fixedly connected to the main body portion and the bit and isolates the bit from the main body portion in an insulating manner.

Since the bit and the main body portion are insulated from each other by means of the insulating adapter, it is possible to effectively prevent the main body portion from being short-circuited due to high-voltage conduction through the bit during tightening, thereby ensuring the service life of the electric tightening device.

In some embodiments, one end of the insulating adapter is provided with a first insertion hole extending in the first direction, the insulating adapter is provided with a first pin hole that extends in a radial direction of the first insertion hole and in communication with the first insertion hole, and the main body portion is inserted into the first insertion hole and is fixedly connected to the insulating adapter via a first pin provided in the first pin hole; and the other end of the insulating adapter is provided with a second insertion hole extending in the first direction, the insulating adapter is provided with a second pin hole that extends in a radial direction of the second insertion hole and in communication with the second insertion hole, and the bit is inserted into the second insertion hole and is fixedly connected to the insulating adapter via a second pin provided in the second pin hole.

With the fixed connection between the main body portion and the insulating adapter and between the bit and the insulating adapter via the pins, the assembly is simple, large torque can be transferred, and the axial movement of the main body portion and the bit can also be limited, thereby improving the accuracy of assembly.

In some embodiments, the first insertion hole and the second insertion hole are each a polygonal insertion hole. In this way, the electric tightening device can transfer greater torque and thus has better operating performance.

In some embodiments, the tightening actuation module further comprises: a supporting component, which is fixedly connected to the mounting base plate and is provided with a positioning hole through which the bit passes. The supporting component can provide radial positioning for the bit to prevent the bit from tilting during tightening, thereby ensuring the tightening quality.

In some embodiments, the plurality of tightening mechanisms are four tightening mechanisms, and the tightening actuation modules of the four tightening mechanisms are arranged in a 2×2 matrix. In this embodiment, the tightening apparatus has a relatively simple structural design, is low in the cost of apparatus, and can be flexibly applied in variety of tightening scenarios.

In some embodiments, the tightening apparatus further comprises: a drag chain provided on the mounting main body. The drag chain is used to protect wires, cables and other pipeline structures of the tightening apparatus, which can improve the wear resistance of circuit so as to improve the reliability during operation of the apparatus and is also conducive to reducing the noise during operation of the apparatus.

In some embodiments, the tightening apparatus further comprises: a mounting flange fixedly connected to the mounting main body; and a carrying apparatus, which is fixedly connected to the mounting flange and configured to move the tightening apparatus to a target operating position. The carrying apparatus can move the tightening apparatus to the target operating position based on program settings, so that the range of products that the tightening apparatus can accommodate is increased.

In some embodiments, the carrying apparatus comprises a carrying robot or a gantry. The carrying robot or the gantry can meet the requirement for carrying the tightening apparatus, has high intelligence, and is labor-saving.

The tightening apparatus according to the embodiments of the present disclosure can reduce the defective rate of multi-axis synchronous tightening of the tightening apparatus, thereby improving the production efficiency and production quality of products. When the mounting positions of the multiple fasteners change with the product type or product specification, the tightening apparatus according to the embodiments of the present disclosure can meet the requirement for multi-axis synchronous tightening of the product, has good compatibility, and can thus reduce the service cost of the apparatus.

According to an aspect of the present disclosure, a control method applied to a tightening apparatus is provided. The control method comprises: collecting image information of a fastener located in a mounting hole; determining positioning information of the fastener based on the image information; determining second-direction position compensation information and third-direction position compensation information of a tightening actuation module based on the positioning information, wherein the tightening actuation module is configured to tighten the fastener into the mounting hole along an axis in a first direction, with a second direction, a third direction and the first direction being orthogonal to each other; and sending the second-direction position compensation information to a second-direction driving mechanism to allow the second-direction driving mechanism to drive the tightening actuation module to move in the second direction based on the second-direction position compensation information, and sending the third-direction position compensation information to a third-direction driving mechanism to allow the third-direction driving mechanism to drive the tightening actuation module to move in the third direction based on the third-direction position compensation information.

In some embodiments, the image information is high-angle shot image information of the head of the fastener.

According to an aspect of the present disclosure, a control device applied to a tightening apparatus is provided. The control device comprises: a collection unit, which is configured to collect image information of a fastener located in a mounting hole; a first determination unit, which is configured to determine positioning information of the fastener based on the image information; a second determination unit, which is configured to determine second-direction position compensation information and third-direction position compensation information of a tightening actuation module based on the positioning information, wherein the tightening actuation module is configured to tighten the fastener into the mounting hole along an axis in a first direction, with a second direction, a third direction and the first direction being orthogonal to each other; and a sending unit-direction driving mechanism, which is configured to send the second-direction position compensation information to a second to allow the second-direction driving mechanism to drive the tightening actuation module to move in the second direction based on the second-direction position compensation information, and to send third-direction position compensation information to a third-direction driving mechanism to allow the third-direction driving mechanism to drive the tightening actuation module to move in the third direction based on the third-direction position compensation information.

According to an aspect of the present disclosure, an electronic apparatus is provided. The electronic apparatus comprises: at least one processor; and a memory communicatively connected to the at least one processor; wherein the memory stores instructions executable by the at least one processor, and the instructions are executed by the at least one processor to enable the at least one processor to implement the control method applied to a tightening apparatus in the foregoing aspect.

According to an aspect of the present disclosure, a computer-readable storage medium storing computer instructions is provided, wherein the computer instructions are configured to enable a computer to implement the control method applied to a tightening apparatus in the foregoing aspect.

According to an aspect of the present disclosure, a computer program product is provided. The computer program product comprises a computer program, wherein the computer program, when executed by a processor, implements the control method applied to a tightening apparatus in the foregoing aspect.

According to the forgoing embodiments of the present disclosure, the defective rate of multi-axis synchronous tightening of the tightening apparatus can be reduced, thereby improving the production efficiency and production quality of products. When the mounting positions of the multiple fasteners change with the product type or product specification, the embodiments of the present disclosure can meet the requirement for multi-axis synchronous tightening of the product, has good compatibility, and can thus reduce the service cost of the apparatus.

The above description is merely an overview of the technical solution of the present disclosure. In order to more clearly understand the technical means of the present disclosure to implement same in accordance with the contents of the description, and in order to make the above and other objectives, features and advantages of the present disclosure more comprehensible, the detailed description of embodiments of the present disclosure are specially described below.

BRIEF DESCRIPTION OF THE DRAWINGS

In the drawings, the same reference numerals denote the same or similar components or elements throughout multiple drawings, unless otherwise specified. The drawings are not necessarily drawn to scale. It should be understood that the drawings depict only some embodiments according to the present disclosure and should not be construed as limiting the scope of the present disclosure.

LIST OF REFERENCE SIGNS

Figure 1:
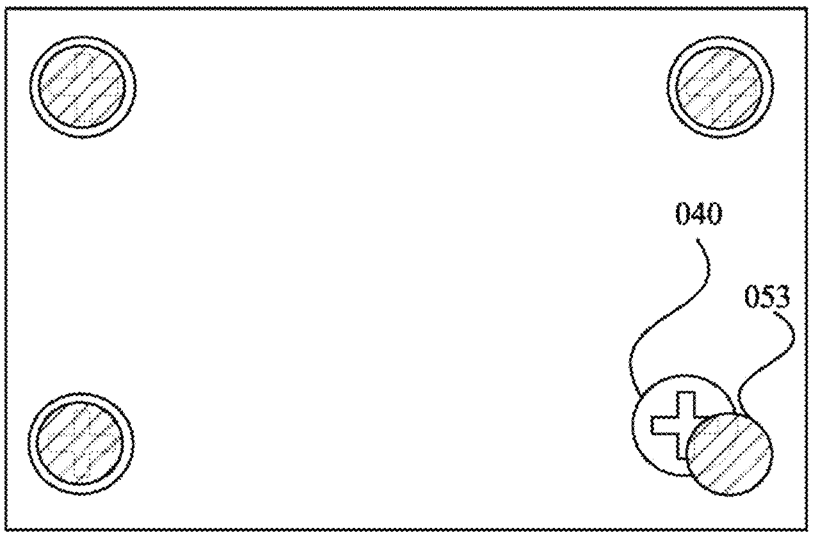
FIG. 1 is a schematic diagram showing misalignment of a bit of a tightening apparatus to a fastener in the related art.

100—tightening apparatus;
110—mounting main body;
130—tightening mechanism;
140—drag chain;
150—mounting flange;
10—tightening actuation module;
11—visual positioning module;
12—second-direction driving mechanism;
13—third-direction driving mechanism;
121—first driving device;
122—first lead screw;
123—first guide rail;
124—first slider;
131—second driving device;
132—second lead screw;
133—second guide rail;
134—second slider;
300—high-angle shot image;
310—contour;
320—specific pattern;
101—mounting base plate;
102—third driving device;
103—third guide rail;
104—third slider;
105—electric tightening device;
51—main body portion;
52—insulating adapter;
400, 040—fastener;
53, 053—bit;
520*a—first insertion hole;*
520*b—second insertion hole;*

521—first pin hole;
522—second pin hole;
56—supporting component;
561—positioning hole;
900—control method applied to a tightening apparatus;
1000—control device applied to a tightening apparatus;
1001—collection unit;
1002—first determination unit;
1003—second determination unit;
1004—sending unit.

DETAILED DESCRIPTION

The embodiments of the technical solutions of the present disclosure will be described in detail below with reference to the accompanying drawings. The following embodiments are merely intended to more clearly illustrate the technical solutions of the present disclosure, so they merely serve as examples, but are not intended to limit the scope of protection of the present disclosure.

Unless otherwise defined, all technical and scientific terms used herein have the same meanings as those commonly understood by those skilled in the art to which the present disclosure belongs. The terms used herein are merely for the purpose of describing specific embodiments, but are not intended to limit the present disclosure. The terms "comprising" and "having" and any variations thereof in the specification and the claims of the present disclosure and in the brief description of the accompanying drawings described above are intended to cover non-exclusive inclusion.

In the description of the embodiments of the present disclosure, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present disclosure, the expression "multiple" means two or more, unless otherwise explicitly and specifically defined.

The phrase "embodiment" mentioned herein means that the specific features, structures, or characteristics described with reference to the embodiments can be encompassed in at least one embodiment of the present disclosure. The phrase at various locations in the specification does not necessarily refer to the same embodiment, or an independent or alternative embodiment exclusive of other embodiments. Those skilled in the art should understand, in explicitly and implicitly manners, that the embodiment described herein may be combined with another embodiment.

In the description of the embodiments of the present disclosure, the phrase "and/or" is merely intended to describe the associated relationship of associated objects, indicating that there may be three relationships, for example, A and/or B may represent three situations, namely, A alone, both A and B, and B alone. In addition, the character "/" herein generally indicates an "or" relationship between the associated objects.

In the description of the embodiments of the present disclosure, the term "multiple" means two or more (including two), similarly the term "multiple groups" means two or more groups (including two groups), and the term "multiple pieces" means two or more pieces (including two pieces).

In the description of the embodiments of the present disclosure, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present disclosure, rather than indicating or implying that the device or element considered must have a particular orientation or be constructed and operated in a particular orientation, and therefore not to be construed as limiting the embodiments of the present disclosure.

In the description of the embodiments of the present disclosure, unless otherwise explicitly specified and defined, the technical terms such as "mounting", "connecting", "connection", and "fixing" should be construed in a broad sense, for example, may be a fixed connection, a detachable connection, or integration; or may be a mechanical connection or an electric connection; or may be a direct connection, or an indirect connection by means of an intermediate medium, or may be the communication between interiors of two elements or the interaction between the two elements. For those of ordinary skills in the art, the specific meanings of the above terms in the embodiments of the present disclosure may be construed according to specific circumstances.

In the related art, a battery comprises a case and a battery module which is located in the case and fixedly connected to the case by means of multiple fasteners (i.e., bolts or screws).

When the battery module is fitted with the case, the multiple fasteners firstly correspondingly pass through multiple mounting holes of the battery module and then positioned (only aligned without tightening) or pre-fixed (turned a certain distance, but not tightened, after alignment) in the multiple mounting holes correspondingly formed in the case, and then a tightening apparatus is used to synchronously tighten the multiple fasteners, thereby achieving fixed connection between the battery module and the case. Since the multiple fasteners have multiple axes, this process is often referred to as multi-axis synchronous tightening.

The inventors of the present disclosure found that when there are large positional deviations after the multiple fasteners are positioned or pre-fixed, the tightening apparatus in the related art cannot achieve accurate alignment of each fastener, for example, cannot achieve accurate alignment of the head(s) of a certain screw or some screws, resulting in synchronous tightening failure, which not only seriously affects the production efficiency of the battery, but also seriously affects the production quality of the battery once the defective products that fail to be tightened are missed. As shown in FIG. 1, when one of the bits 053 of a tightening apparatus cannot be accurately aligned to a fastener 040, the fastener 040 will fail to be tightened.

In addition, when the specification of the battery is changed, the mounting positions of the multiple fasteners are changed, and the tightening apparatus in the related art cannot be used compatibly, resulting in high service cost of apparatus.

The inventors of the present disclosure also noted that in other technical fields in addition to the field of battery production, there are also similar technical problems mentioned above when it is necessary to use multi-axis synchronous tightening.

In view of the above considerations, after further research, the inventors provide a tightening apparatus, a control method and a control device applied to a tightening apparatus, an electronic apparatus, a computer-readable storage medium, and a computer program product, in order to reduce the defective rate of multi-axis synchronous tightening, thereby improving the production efficiency and production quality of products.

The tightening apparatus provided in some embodiments of the present disclosure comprises a mounting main body and a plurality of tightening mechanisms provided on the mounting main body. Each tightening mechanism is configured to tighten one fastener and comprises a tightening actuation module, a visual positioning module, a second-direction driving mechanism, and a third-direction driving mechanism. When multiple fasteners have large positional deviations after positioning or pre-fixing, the visual positioning modules can determine positioning information (i.e., coordinate information in a plane coordinate system) of the fasteners based on image information of the fasteners in mounting holes and then determine second-direction position compensation information (i.e., the displacement compensated by the movement in a second direction) and third-direction position compensation information (i.e., the displacement compensated by the movement in a third direction) of the tightening actuation modules based on the positioning information, and the second-direction driving mechanisms and the third-direction driving mechanisms can drive the tightening actuation modules to move in respective directions based on the compensation information in the respective directions, such that the tightening actuation modules are adjusted to appropriate positions and then accurately aligned to the fasteners.

Since the multiple tightening actuation modules of the tightening apparatus can be accurately aligned to the respective fasteners, the defective rate of multi-axis synchronous tightening of the tightening apparatus can be reduced, thereby improving the production efficiency and production quality of products. In addition, when the mounting positions of the multiple fasteners change with the product type or product specification, the tightening apparatus according to the embodiments of the present disclosure can meet the requirement for multi-axis synchronous tightening of the product, has good compatibility, and can thus reduce the service cost of the apparatus.

The tightening apparatus according to the embodiments of the present disclosure can be applied not only in the automatic production and assembly of batteries, but also in other scenarios, in which multi-axis synchronous tightening needs to be used, in addition to the field of battery production, which will not be specifically limited in the present disclosure.

The battery disclosed in the embodiments of the present disclosure may be a traction battery or an energy storage battery. The application scenarios of the traction battery include, but not limited to, vehicles, ships, aircraft, spacecraft, electric tools, electric toys, various mobile terminals, etc. The application scenarios of the energy storage battery include, but not limited to, solar power generation systems, hydroelectric generation systems, wind power generation systems, etc. The battery may be a primary battery that can be discharged only, or may be a secondary battery that can be repeatedly charged and discharged. The type of the battery may be, for example, a lithium ion battery, a sodium ion battery, a hydrogen battery, a vanadium battery, etc., which will not be specifically limited in the present disclosure.

Figure 2:
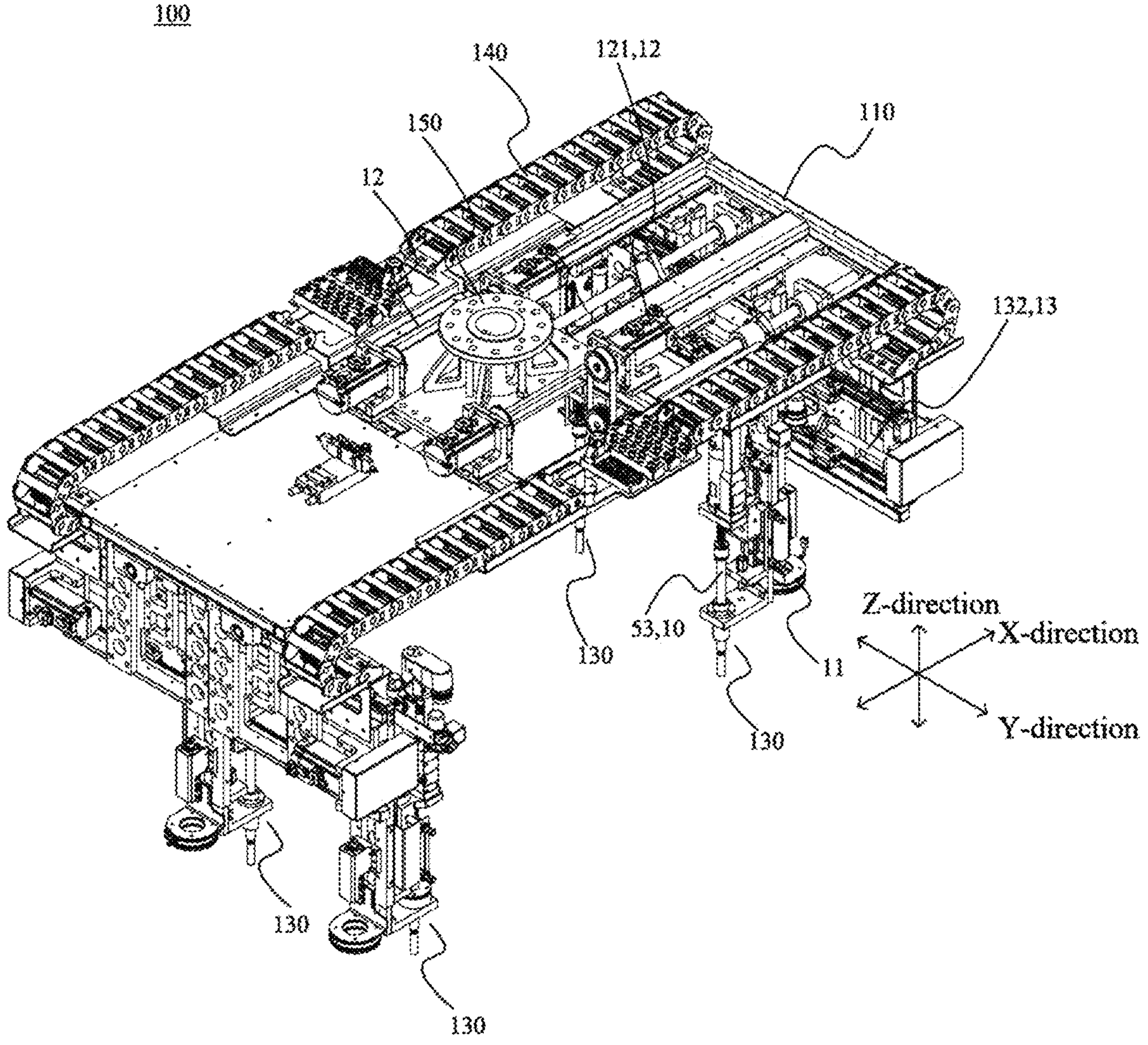
FIG. 2 is a schematic perspective structural diagram of a tightening apparatus according to some embodiments of the present disclosure.
Figure 3:
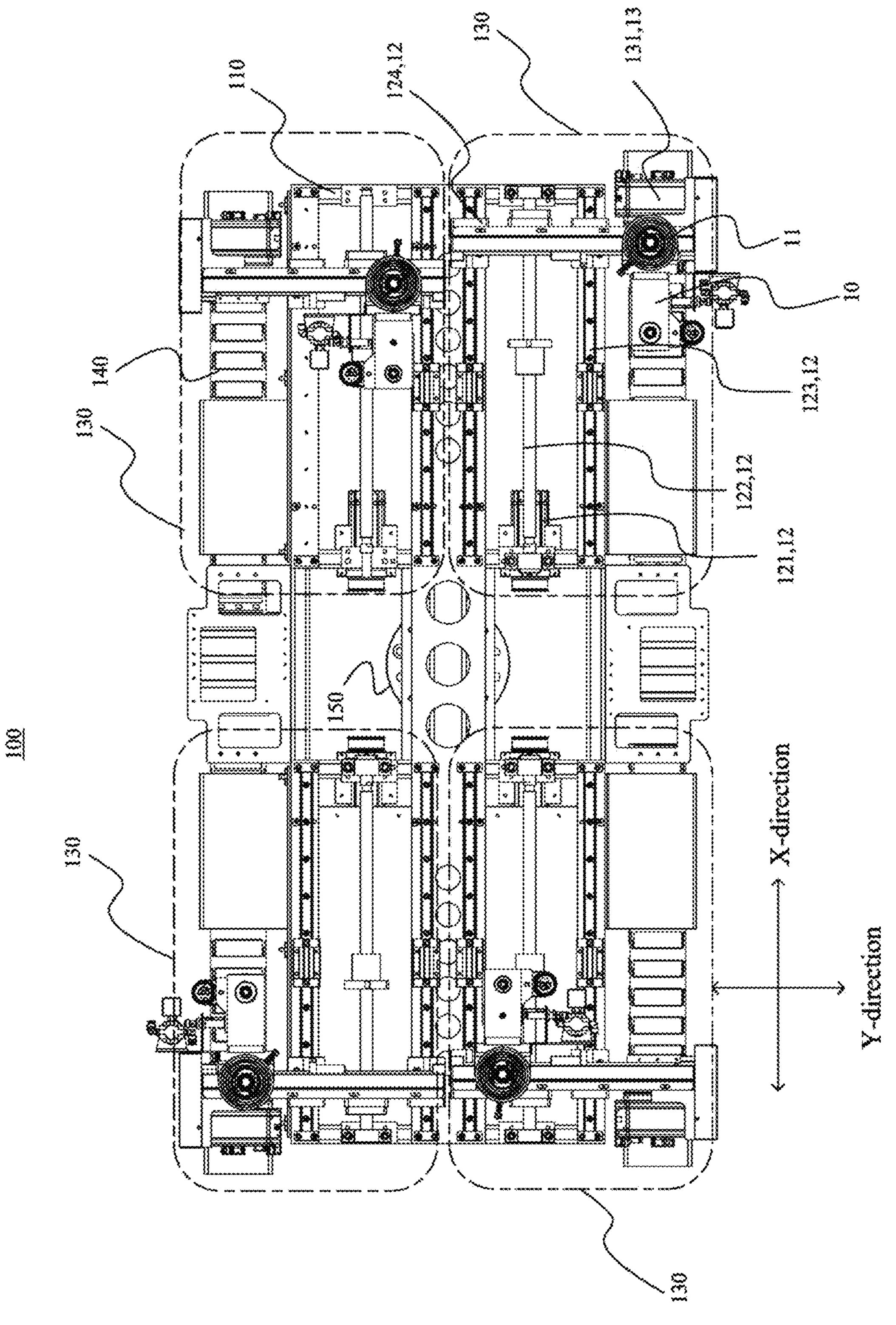
FIG. 3 is a schematic structural bottom view of a tightening apparatus according to some embodiments of the present disclosure.
Figure 4:
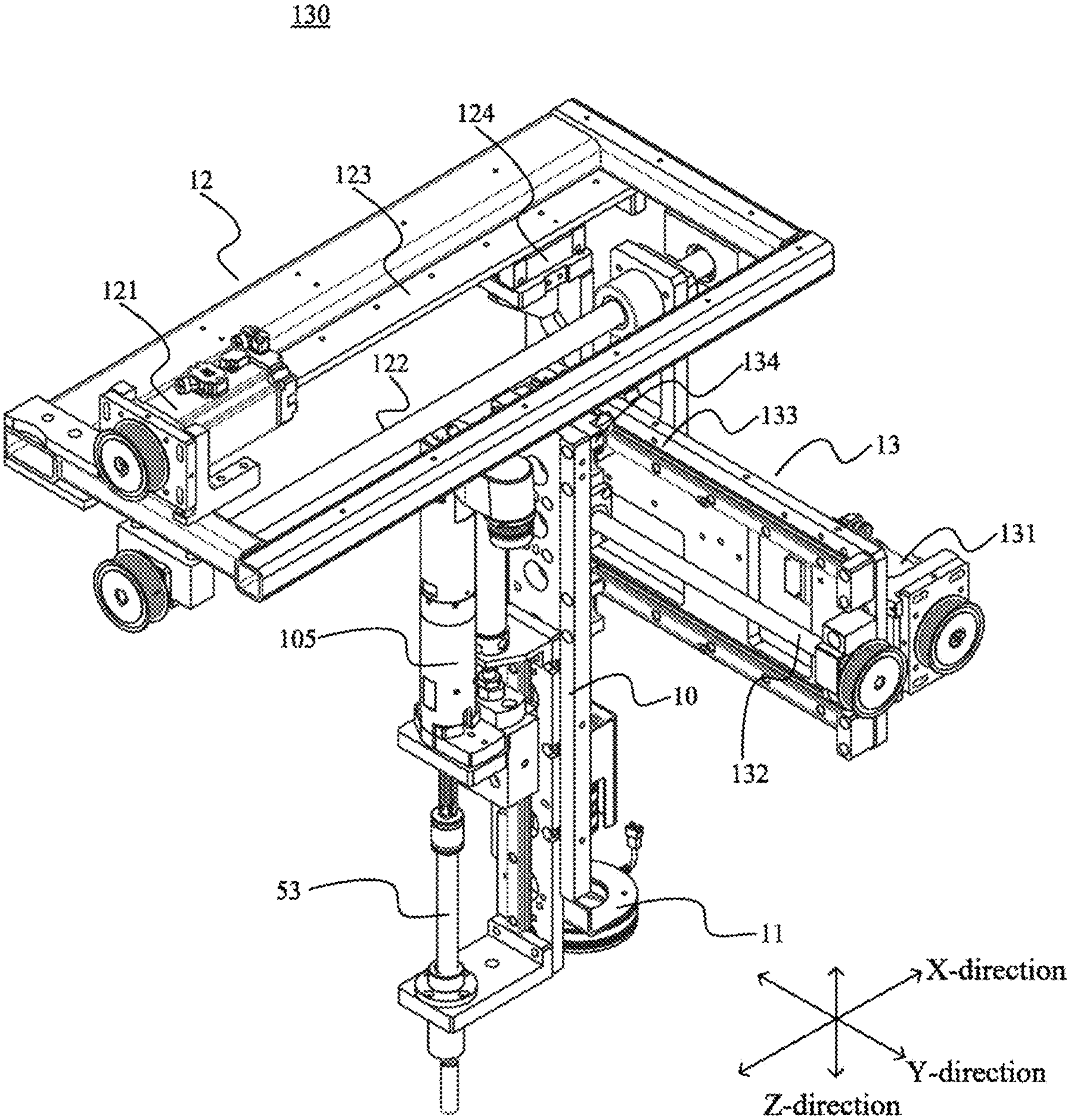
FIG. 4 is a schematic perspective structural diagram of a tightening mechanism according to some embodiments of the present disclosure.

As shown in FIGS. 2, 3, and 4, a tightening apparatus 100 provided in the embodiments of the present disclosure comprises a mounting main body 110 and a plurality of tightening mechanisms 130 provided on the mounting main body 110. Each tightening mechanism 130 comprises a tightening actuation module 10, a visual positioning module 11, a second-direction driving mechanism 12, and a third-direction driving mechanism 13. The tightening actuation module 10 is configured to tighten a fastener into a mounting hole along an axis in a first direction (the fastener and the mounting hole are not shown). The visual positioning module 11 is configured to collect image information of the fastener located in the mounting hole, determine positioning information of the fastener based on the image information, and determine second-direction position compensation information and third-direction position compensation information of the tightening actuation module 10 based on the positioning information of the fastener. The second-direction driving mechanism 12 is configured to drive the tightening actuation module 10 to move in a second direction based on the second-direction position compensation information. The third-direction driving mechanism 13 is configured to drive the tightening actuation module 10 to move in a third direction based on the third-direction position compensation information. The second direction, the third direction and the first direction are orthogonal to each other.

In the embodiments of the present disclosure, the second direction, the third direction and the first direction are orthogonal to each other, for example, the second direction may be a horizontal direction (the X-direction as shown in the figures), the third direction may be a horizontal direction (the Y-direction as shown in the figures), and the first direction may be a vertical direction. However, the present disclosure is not limited thereto, for example, in other embodiments of the present disclosure, the second direction and the first direction may be horizontal directions, and the third direction may be a vertical direction.

In the embodiments of the present disclosure, the fastener is not limited in specific type and may be, for example, a screw (composed of a head portion and a screw stem portion), a bolt (composed of a head portion and a screw stem portion, typically used in cooperation with a nut), etc. The mounting hole may be, for example, a threaded through hole, a threaded blind hole, etc., which will not be specifically limited in the present disclosure.

In the tightening mechanism 130, the tightening actuation module 10 is configured to screw the head of the fastener about the axis in the first direction (e.g., an axis in a vertical direction) so as to tighten the fastener into the mounting hole. A tightening end of the tightening actuation module 10 is a bit 53 (a bit referring to a detachable screwdriver head), which is not limited in specific type and may be, for example, a cross bit, a slot-type bit, a star bit, a square bit, a hexagonal bit, etc., and may be selected according to the specific assembly requirements.

The tightening apparatus 100 according to the embodiments of the present disclosure can synchronously tighten the multiple fasteners in the respectively mounting holes by means of the plurality of tightening mechanisms 130, so as to achieve the fixed connection of two assembled parts (e.g., a battery module and a case) at various positions, such that the two assembled parts can be reliably and fixedly connected together.

The mounting main body 110 is configured to reliably support and mount the tightening mechanisms 130 and other structures. The number of the tightening mechanisms 130 comprised in the tightening apparatus 100 is not limited and may be, for example, two, three, four, five, six, etc.

In the embodiments as shown in FIG. 3, in order to meet the requirement of production efficiency, it is designed that four tightening mechanisms 130 are provided, and the tightening actuation modules 10 of the four tightening mechanisms 130 are arranged in a 2×2 matrix, such that four fasteners can be synchronously tightened in the respective mounting holes.

In this embodiment, the tightening apparatus 100 has a relatively simple structural design, is low in the cost of apparatus, and can be flexibly applied in a variety of tightening scenarios. For example, a total of 2×6 screw fastening points are provided between two assembled parts, and the 2×6 screw fastening points may be divided into three groups, each of which includes 2×2 screw fastening points, and the tightening apparatus 100 may carry out a tightening operation at the three groups of screw fastening points in sequence by means of the four tightening mechanisms 130.

In other embodiments of the present disclosure, the tightening actuation modules 10 of the plurality of tightening mechanisms 130 may also be arranged in other regular or irregular manners, which will not be specifically limited in the present disclosure.

Figure 5A:
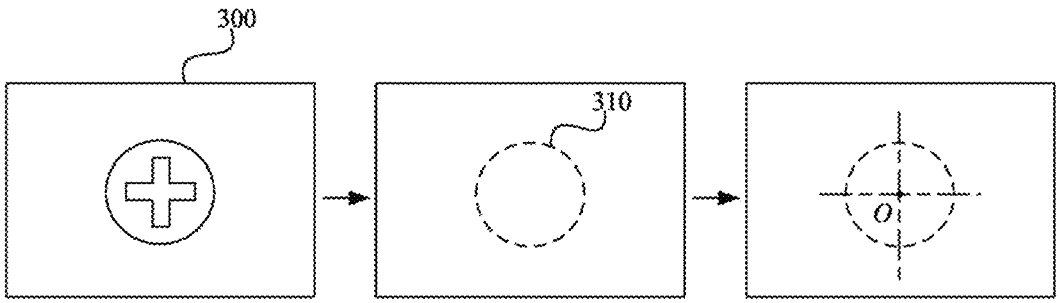
FIG. 5A is a schematic diagram showing determination of positioning information of a fastener by means of a visual positioning module according to some embodiments of the present disclosure.
Figure 5B:
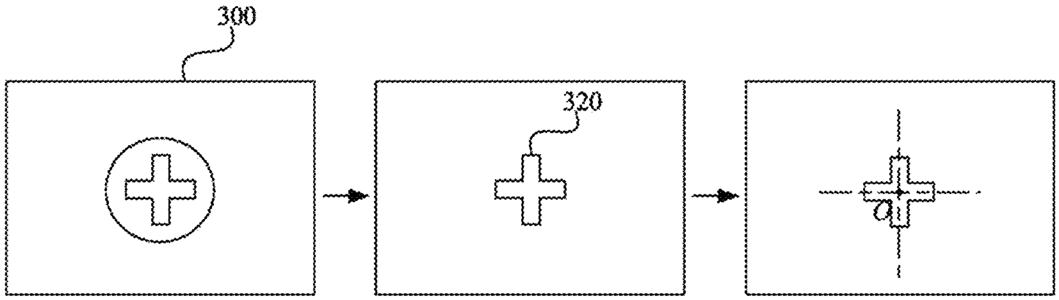
FIG. 5B is a schematic diagram showing determination of the positioning information of the fastener by means of the visual positioning module according to further embodiments of the present disclosure.

In the embodiments of the present disclosure, the visual positioning module 11 may comprise a camera and a processing unit. The camera is configured to capture and collect image information of the fastener, for example, capture and collect high-angle shot image information of the head of the fastener. The processing unit determines positioning information of the fastener based on the image information of the fastener. As shown in FIG. 5A, the processing unit may firstly extract a contour 310 of the head of the fastener from the high-angle shot image 300 of the head of the fastener, and then obtain the coordinates of the geometric center O of the contour 310 in an XY plane coordinate system through calculation, which is used as the positioning information of the fastener. As shown in FIG. 5B, the processing unit may firstly extract a specific pattern 320 (i.e., a cross pattern) of the head of the fastener from the high-angle shot image 300 of the head of the fastener, and then obtain the coordinates of the center O of the specific pattern 320 in an XY plane coordinate system through calculation, which is used as the positioning information of the fastener. The processing unit further determines the second-direction position compensation information and the third-direction position compensation information of the tightening actuation module 10 based on the positioning information, for example, compares the positioning information of the fastener with the positioning information of the bit of the tightening actuation module 10, so as to obtain the displacement compensated by the movement of the tightening actuation module 10 in the second direction and in the third direction. The displacement to be compensated by the movement of the tightening actuation module 10 in the second direction and/or the displacement to be compensated by the movement in the third direction may be zero or not.

Figure 6:
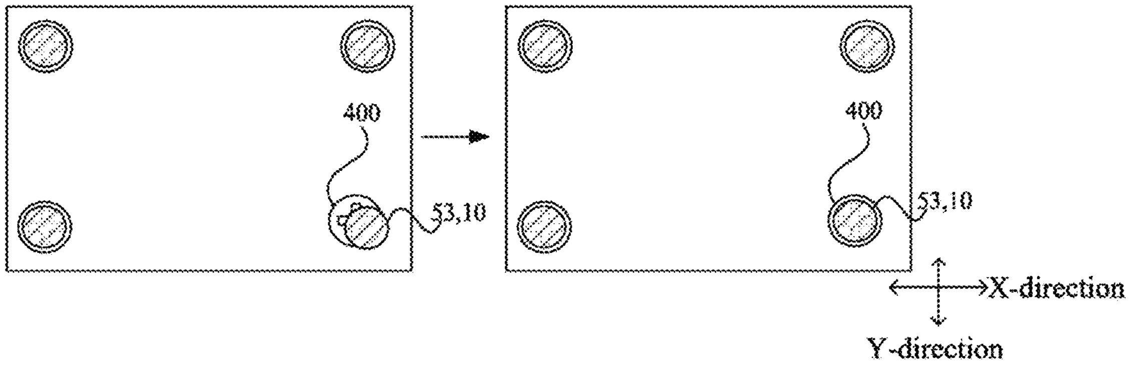
FIG. 6 is a comparative schematic diagram of a bit of the tightening apparatus before and after position compensation adjustment according to some embodiments of the present disclosure.

The second-direction driving mechanism 12 can drive the tightening actuation module 10 to move in the second direction based on the second-direction position compensation information, and the third-direction driving mechanism 13 can drive the tightening actuation module 10 to move in the third direction based on the third-direction position compensation information, so that the tightening actuation module 10 can be accurately aligned to the respective fastener after the position compensation adjustment. As shown in FIG. 6, before the position compensation adjustment of one of the tightening actuation modules 10, the bit 53 thereof has a significant positional deviation from the fastener 400; and after the position compensation adjustment of the tightening actuation module 10, the bit 53 thereof can be accurately aligned to the fastener 400, and then the tightening operation is carried out, which can effectively avoid the tightening failure.

With the tightening apparatus 100 according to the embodiments of the present disclosure, since the multiple tightening actuation modules 10 of the tightening apparatus 100 can be accurately aligned to the respective fasteners, the defective rate of multi-axis synchronous tightening of the tightening apparatus 100 can be reduced, thereby improving the production efficiency and production quality of products. In addition, when the mounting positions of the multiple fasteners change with the product type or product specification, the tightening apparatus 100 according to the embodiments of the present disclosure can be adapted to the requirement of multi-axis synchronous tightening of various products by means of adjusting the positions of the tightening actuation modules 10, and can thus reduce the service cost of the apparatus.

As shown in FIG. 2, in this embodiment of the present disclosure, the second direction is a horizontal direction, the third direction is a horizontal direction, the first direction is a vertical direction, and the image information is high-angle shot image information of the head of the fastener. That is, the camera of the visual positioning module 11 photographs the fastener from a top view. In this way, the contour pattern contained in the image information is relatively regular and clear, which is convenient for rapid and accurate determination of the positioning information of the fastener by the processing unit. In other embodiments of the present disclosure, the camera of the visual positioning module 11 may also photograph the fastener from other angles, and the processing unit may also determine the positioning information of the fastener through calculation. The present disclosure does not specifically define the specific photography angle at which the image information is collected.

The specific structural forms of the second-direction driving mechanism 12 and the third-direction driving mechanism 13 are not limited in the embodiments of the present disclosure.

As shown in FIG. 4, in some embodiments, the second-direction driving mechanism 12 comprises: a first driving device 121, a first lead screw 122 extending in the second direction and driven by the first driving device 121 to rotate, a first guide rail 123 extending in the second direction, and a first slider 124 slidably fitted with the first guide rail 123 and driven by the first lead screw 122 to move in the second direction. The third-direction driving mechanism 13 is provided on the first slider 124 and comprises: a second driving device 131, a second lead screw 132 extending in the third direction and driven by the second driving device 131 to rotate, a second guide rail 133 extending in the third direction, and a second slider 134 slidably fitted with the second guide rail 133 and driven by the second lead screw 132 to move in the third direction, wherein the tightening actuation module 10 is arranged on the second slider 134.

The design in this embodiment can provide reliable mechanical transmission for the movement of the tightening actuation module 10 in the second direction and the third direction, which is conducive to improving the accuracy of position compensation adjustment of the tightening actuation module 10.

In the embodiments of the present disclosure, the "fixed connection" between two components may be a direct fixed connection, or may be an indirect fixed connection by means of an intermediate member. The "transmission connection" between two components can be understood that transmission of power can be achieved between the two components, and thus the transmission of power can be achieved between the two components either directly, or indirectly by means of an intermediate member. As shown in FIG. 4, in some embodiments, in order to improve the space utilization, the first driving device 121 and the first lead screw 122 are arranged non-coaxially, and the transmission of power can be achieved between the first driving device 121 and the first lead screw 122 indirectly by means of belt transmission or sprocket transmission.

The first driving device 121 and the second driving device 131 serve as power sources, which are not limited in specific type and may be a servo motor, a stepping motor, etc. The servo motor refers to an electric motor that controls the operation of mechanical elements in a servo system, is a device that supplements an indirect speed change of a motor, and has high control precision, good low-speed operation stability, good torque-frequency characteristics, etc. The stepping motor is an electric motor by which an electric pulse signal is converted into corresponding angular displacement or linear displacement (converted into angular displacement in the embodiments of the present disclosure). As shown in FIG. 4, in this embodiment, the first driving device 121 and the second driving device 131 are each a servo motor.

A lead screw (also referred to as a screw rod) functions to convert a rotary motion, which is output by a driving device, into a linear motion, and has a basic structure comprising a screw stem, a nut for conversion into a linear motion as the angle of rotation of the screw stem according to the lead of a corresponding specification, and a nut seat connected to the nut, with a driven member being connected to the nut by means of the nut seat and thus accordingly moving in a linear motion. In the embodiments of the present disclosure, the first lead screw 122 and the second lead screw 132 are not limited in specific type and may be sliding lead screws, ball lead screws, etc. The sliding lead screw has the advantages of good transmission performance, high precision, being convenient to machine, etc., and the ball lead screw has the advantages of low friction, high transmission efficiency, high precision, etc. and has a more complicated manufacturing process than the sliding lead screw.

The first guide rail 123 is configured to guide the movement of the first slider 124 in the second direction, and is not limited in specific structural form, for example, may be designed as a grooved guide rail, a ribbed guide rail, etc. The first slider 124 serves as a sliding member for mounting and supporting the third-direction driving mechanism 13. The second guide rail 133 is configured to guide the movement of the second slider 134 in the third direction, and is not limited in specific structural form, for example, may be designed as a grooved guide rail, a ribbed guide rail, etc. The second slider 134 serves as a sliding member for mounting and supporting the tightening actuation module 10. Thus, the first slider 124 is driven to move in the second direction, and thus the entire third-direction driving mechanism 13 can be driven to move in the second direction, and the tightening actuation module 10 accordingly moves in the second direction; and the second slider 134 is driven to move in the third direction, and thus the tightening actuation module 10 can be driven to move in the third direction, so as to finally achieve the movement compensation adjustment of the tightening actuation module 10 in the second direction and the third direction.

Figure 7:
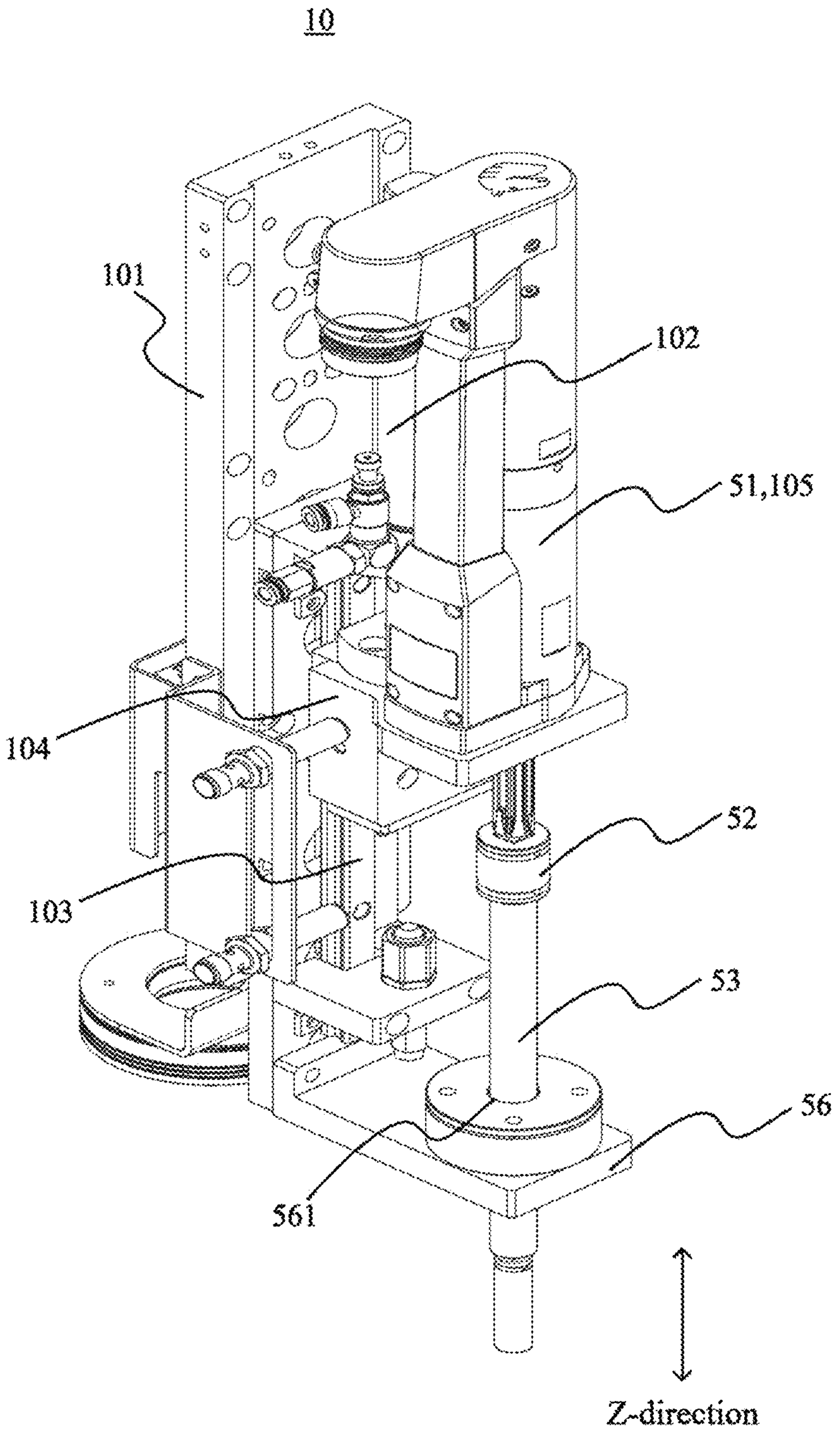
FIG. 7 is a schematic perspective structural diagram of a tightening actuation module according to some embodiments of the present disclosure.

The specific structural form of the tightening actuation module 10 is not limited in the embodiments of the present disclosure. As shown in FIG. 7, in some embodiments, the tightening actuation module 10 comprises: a mounting base plate 101 fixedly connected to the second slider 134, a third driving device 102 fixedly connected to the mounting base plate 101, a third guide rail 103 fixedly connected to the mounting base plate 101 and extending in the first direction, a third slider 104 slidably fitted with the third guide rail 103 and driven by the third driving device 102 to move in the first direction, and an electric tightening device 105 fixedly connected to the third slider 104. The electric tightening device 105 is configured to tighten a fastener into a mounting hole along an axis in a first direction.

The mounting base plate 101 is configured to mount and support other components of the tightening actuation module 10. In some embodiments of the present disclosure, a pneumatic cylinder is used as the third driving device 102. The pneumatic cylinder is mainly composed of a cylinder barrel, an end cover, a piston, a piston rod and a sealing member, is a pneumatic actuation element that converts pressure energy of compressed gas into mechanical energy, and has the advantages of simple structure and easy installation and maintenance. In other embodiments of the present disclosure, the third driving device 102 may also be a linear motor, etc., which will not be specifically limited in the present disclosure. By means of controlling the third driving device 102, the third slider 104 and the electric tightening device 105 can be controlled to move a certain distance in the first direction at an appropriate speed, so that the bit 53 of the electric tightening device 105 can carry out a tightening action under pressure, achieving high reliability and precision of mechanical transmission.

The third guide rail 103 is configured to guide the movement of the third slider 104 in the first direction, and is not limited in specific structural form, for example, may be designed as a grooved guide rail, a ribbed guide rail, etc. The third slider 104 is configured to support and mount the electric tightening device 105. The end of the bit 53 of the electric tightening device 105 is snap-fitted to the head of the fastener, so that the fastener can be tightened into the mounting hole.

As shown in FIG. 7, in some embodiments of the present disclosure, the electric tightening device 105 comprises a main body portion 51, a bit 53, and an insulating adapter 52, wherein the insulating adapter 52 is arranged between the main body portion 51 and the bit 53 and fixedly connected to the main body portion 51 and the bit 53, and the insulating adapter 52 isolates the bit 53 from the main body portion 51 in an insulating manner.

An electric motor is provided in the main body portion 51, and the electric motor drives the bit 53 to carry out a tightening action when receiving a starting signal. The bit 53 and the main body portion 51 are insulated from each other by means of the insulating adapter 52, which can effectively prevent the main body portion 51 from being short-circuited due to high-voltage conduction through the bit 53 during tightening, thereby ensuring the service life of the electric tightening device 105.

The insulating adapter 52 may be, for example, a ceramic insulating adapter, a plastic insulating adapter, etc.

Figure 8:
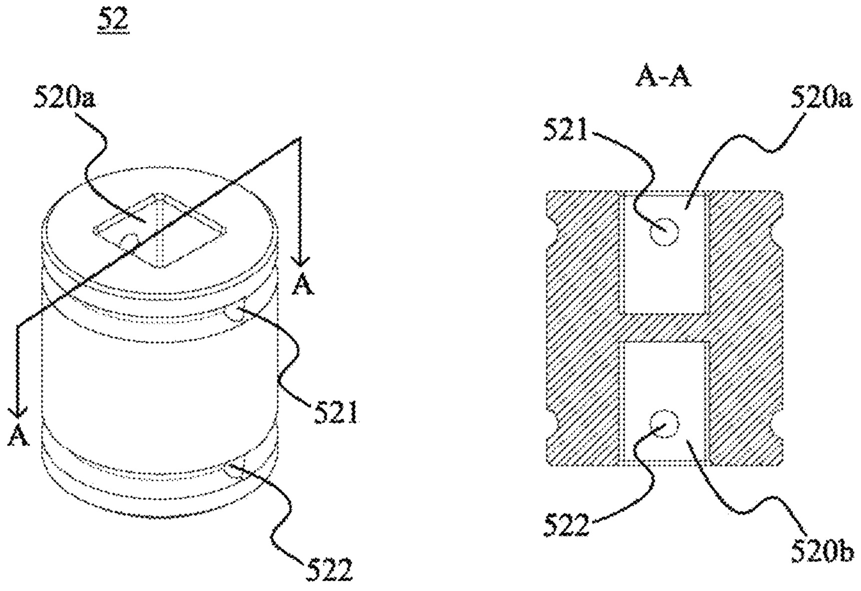
FIG. 8 is a schematic structural diagram of an insulating adapter of an electric tightening device according to some embodiments of the present disclosure.

The specific structural form of the insulating adapter 52 is not limited. As shown in FIGS. 7 and 8, in some embodiments of the present disclosure, one end of the insulating adapter 52 (the end close to the main body portion 51) is provided with a first insertion hole 520*a* that extends in the first direction, the insulating adapter 52 is provided with a first pin hole 521 that extends in a radial direction of the first insertion hole 520*a* and in communication with the first insertion hole 520*a,* and the main body portion 51 is inserted into the first insertion hole 520*a* and is fixedly connected to the insulating adapter 52 via a first pin (not shown) provided in the first pin hole 521. The other end of the insulating adapter 52 (the end close to the bit 53) is provided with a second insertion hole 520*b* that extends in the first direction, the insulating adapter 52 is provided with a second pin hole 522 that extends in a radial direction of the second insertion hole 520*b* and in communication with the second insertion hole 520*b*, and the bit 53 is inserted into the second insertion hole 520*b* and is fixedly connected to the insulating adapter 52 via a second pin (not shown) provided in the second pin hole 522.

With the fixed connection between the main body portion 51 and the insulating adapter 52 and between the bit 53 and the insulating adapter 52 via the pins, the assembly is simple, large torque can be transferred, and the axial movement of the main body portion 51 and the bit 53 can also be avoided, thereby improving the accuracy of assembly.

In further embodiments of the present disclosure, the fixed connection between the main body portion 51 and the insulating adapter 52 and between the bit 53 and the insulating adapter 52 may also be achieved by means of magnetic attraction, achieving simpler assembly and disassembly.

In some embodiments, the first insertion hole 520*a* and the second insertion hole 520*b* are polygonal insertion holes, for example, square insertion holes (as shown in FIG. 8), regular hexagonal insertion holes, etc. Accordingly, the portion of the main body portion 51 mating with the first insertion hole 520*a* and the portion of the bit 53 mating with the second insertion hole 520*b* are of a prismatic design, which can thus transfer larger torque to improve the operating performance of the electric tightening device 105.

Referring to FIG. 7, in this embodiment, the tightening actuation module 10 further comprises a supporting component 56 fixedly connected to the mounting base plate 101, and the supporting component 56 is provided with a positioning hole 561 through which the bit 53 passes. The bit 53 and the positioning hole 561 are in a clearance fit. The supporting component 56 may provide radial positioning for the bit 53 to prevent the bit 53 from tilting during tightening, thereby improving the success rate of tightening.

As shown in FIG. 2, in some embodiments of the present disclosure, the tightening apparatus 100 further comprises a drag chain 140 provide on the mounting main body 110. The drag chain, also known as a tank chain, is a device that binds cables, wires, air pressure pipes or oil pressure pipes to facilitate the rotation and movement thereof, and can have traction and protection functions.

The drag chain 140 is used to protect wires, cables and other pipeline structures of the tightening apparatus 100, which can improve the wear resistance of circuit so as to improve the reliability during operation of the apparatus and is also conducive to reducing the noise during operation of the apparatus.

Continuing to refer to FIG. 2, in some embodiments of the present disclosure, the tightening apparatus 100 may further comprise: a mounting flange 150 fixedly connected to the mounting main body 110, and a carrying apparatus (not shown) fixedly connected to the mounting flange 150 and configured to move the tightening apparatus 100 to a target operating position.

The mounting flange 150 and the mounting main body 110 can be fixedly connected with each other by means of bolts, so as to achieve reliable installation and easy assembly and disassembly. The carrying apparatus may move the tightening apparatus 100 to the target operating position based on program settings, such that the range of products that the tightening apparatus 100 can accommodate can be further increased.

For example, a total of 2×6 screw fastening points may be provided between two assembled parts, and the 2×6 screw fastening points may be divided into three groups, then the tightening apparatus 100 tightens the first group of 2×2 screws in a first operating position, and then the carrying apparatus moves the tightening apparatus 100 to a second operating position where the second group of 2×2 screws are tightened.

The specific type of the carrying apparatus is not limited and may be, for example, a carrying robot or a gantry. The carrying robot is an automation product that replaces manual carrying with robot motion trajectory. The gantry can move the apparatus in daily production to meet the requirement for lifting and maintenance of the apparatus.

In the forgoing embodiments, the design facilitates the movement of the tightening apparatus 100, which can reduce the labor consumption, reduce the production and operation costs and improve the production efficiency, so that the tightening apparatus 100 can accommodate a wider range of products.

As shown in FIGS. 2, 3, 4, and 7, the tightening apparatus 100 provided in some embodiments of the present disclosure comprises a mounting main body 110 and a plurality of tightening mechanisms 130 provided on the mounting main body 110. Each tightening mechanism 130 comprises a tightening actuation module 10, a visual positioning module 11, a second-direction driving mechanism 12, and a third-direction driving mechanism 13. The tightening actuation module 10 is configured to tighten a fastener into a mounting hole along an axis in a first direction. The visual positioning module 11 is configured to collect image information of the fastener located in the mounting hole, determine positioning information of the fastener based on the image information, and determine second-direction position compensation information and third-direction position compensation information of the tightening actuation module 10 based on the positioning information of the fastener. The second-direction driving mechanism 12 is configured to drive the tightening actuation module 10 to move in a second direction based on the second-direction position compensation information. The third-direction driving mechanism 13 is configured to drive the tightening actuation module 10 to move in a third direction based on the third-direction position compensation information. In this embodiment, the second direction, the third direction and the first direction are orthogonal to each other, the second direction is a horizontal direction, the third direction is a horizontal direction, the first direction is a vertical direction, and the visual positioning module 11 is configured to collect the high-angle shot image information of the head of the fastener.

As shown in FIGS. 2 and 3, in this embodiment, it is designed that four tightening mechanisms 130 are provided, and the tightening actuation modules 10 of the four tightening mechanisms 130 are arranged in a 2×2 matrix, such that four fasteners can be synchronously tightened in the respective mounting holes.

As shown in FIG. 4, in this embodiment, the second-direction driving mechanism 12 comprises a first driving device 121, a first lead screw 122 extending in the second direction and driven by the first driving device 121 to rotate, a first guide rail 123 extending in the second direction, and a first slider 124 slidably fitted with the first guide rail 123 and driven by the first lead screw 122 to move in the second direction. The third-direction driving mechanism 13 is provided on the first slider 124 and comprises: a second driving device 131, a second lead screw 132 extending in the third direction and driven by the second driving device 131 to rotate, a second guide rail 133 extending in the third direction, and a second slider 134 slidably fitted with the second guide rail 133 and driven by the second lead screw 132 to move in the third direction, wherein the tightening actuation module 10 is arranged on the second slider 134. The first driving device 121 and the second driving device 131 may be servo motors.

As shown in FIG. 7, in this embodiment, the tightening actuation module 10 comprises: a mounting base plate 101 fixedly connected to the second slider 134, a third driving device 102 fixedly connected to the mounting base plate 101, a third guide rail 103 fixedly connected to the mounting base plate 101 and extending in the first direction, a third slider 104 slidably fitted with the third guide rail 103 and driven by the third driving device 102 to move in the first direction, and an electric tightening device 105 fixedly connected to the third slider 104. The electric tightening device 105 is configured to tighten a fastener into a mounting hole along an axis in a first direction and comprises a main body portion 51, a bit 53 and an insulating adapter 52, wherein the insulating adapter 52 is arranged between the main body portion 51 and the bit 53 and fixedly connected to the main body portion 51 and the bit 53, and the insulating adapter 52 isolates the bit 53 from the main body portion 51 in an insulating manner. An electric motor is provided in the main body portion 51, and the electric motor drives the bit 53 to carry out a tightening action when receiving a starting signal. The bit 53 and the main body portion 51 are insulated from each other by means of the insulating adapter 52, which can effectively prevent the main body portion 51 from being short-circuited due to high-voltage conduction through the bit 53 during tightening, thereby ensuring the service life of the electric tightening device 105.

With the tightening apparatus 100 according to the embodiments of the present disclosure, since the multiple tightening actuation modules 10 of the tightening apparatus 100 can be accurately aligned to the respective fasteners, the defective rate of multi-axis synchronous tightening of the tightening apparatus 100 can be reduced, thereby improving the production efficiency and production quality of products. In addition, when the mounting positions of the multiple fasteners change with the product type or product specification, the tightening apparatus 100 according to the embodiments of the present disclosure can be adapted to the requirement of multi-axis synchronous tightening of various products by means of adjusting the positions of the tightening actuation modules 10, and can thus reduce the service cost of the apparatus.

Figure 9:
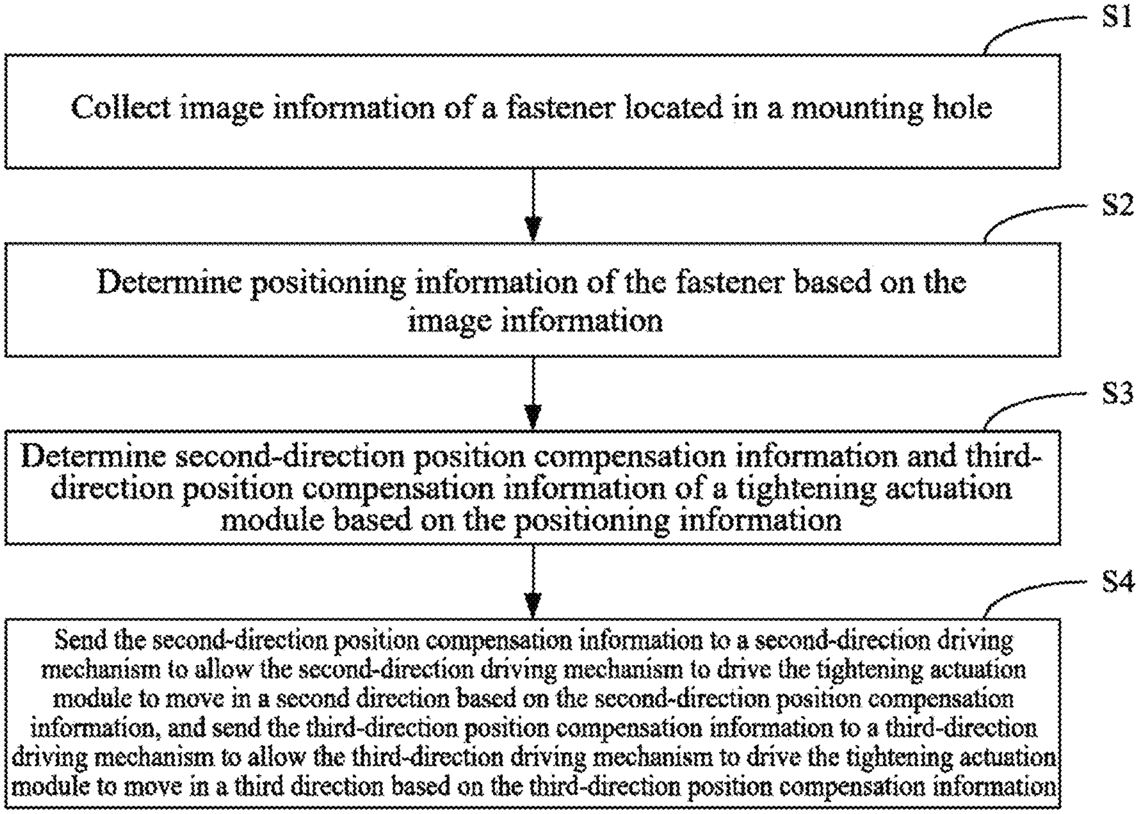
FIG. 9 is a schematic flowchart of a control method applied to a tightening apparatus according to some embodiments of the present disclosure.

As shown in FIG. 9, some embodiments of the present disclosure further provide a control method 900 applied to a tightening apparatus, the control method comprising steps S1 to S4 as follows.

At step S1, image information of the fastener located in the mounting hole is collected.

At step S2, positioning information of the fastener is determined based on the image information.

At step S3, second-direction position compensation information and third-direction position compensation information of a tightening actuation module are determined based on the positioning information, wherein the tightening actuation module is configured to tighten the fastener into the mounting hole along an axis in a first direction, with a second direction, a third direction and the first direction being orthogonal to each other.

At step S4, the second-direction position compensation information is sent to a second-direction driving mechanism to allow the second-direction driving mechanism to drive the tightening actuation module to move in the second direction based on the second-direction position compensation information, and the third-direction position compensation information is sent to a third-direction driving mechanism to allow the third-direction driving mechanism to drive the tightening actuation module to move in the third direction based on the third-direction position compensation information.

According to the control method according to the embodiments of the present disclosure, the defective rate of multi-axis synchronous tightening of the tightening apparatus can be reduced, thereby improving the production efficiency and production quality of products. When the mounting positions of the multiple fasteners change with the product type or product specification, the control method according to the embodiments of the present disclosure can meet the requirement for multi-axis synchronous tightening of the product, has good compatibility, and can thus reduce the service cost of the apparatus.

In some embodiments, at step S1, the collected image information is high-angle shot image information of the head of the fastener. In this way, the image information contains a regular and clear contour pattern, which is convenient for rapid and accurate determination of the positioning information of the fastener.

Figure 10:
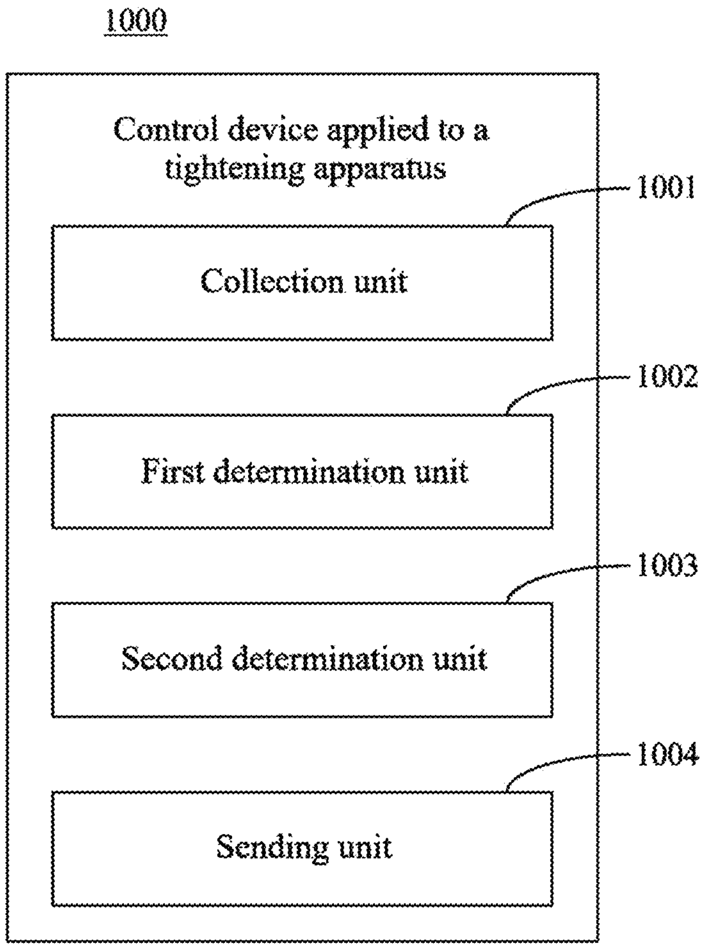
FIG. 10 is a structural block diagram of a control device applied to a tightening apparatus according to some embodiments of the present disclosure.

As shown in FIG. 10, in some embodiments of the present disclosure, a control device 1000 applied to a tightening apparatus is further provided. The control device comprises:

a collection unit 1001 configured to collect image information of a fastener located in a mounting hole;

a first determination unit 1002 configured to determine positioning information of the fastener based on the image information;

a second determination unit 1003, which is configured to determine second-direction position compensation information and third-direction position compensation information of a tightening actuation module based on the positioning information, wherein the tightening actuation module is configured to tighten the fastener into the mounting hole along an axis in a first direction, and a second direction, a third direction and the first direction are orthogonal to each other; and a sending unit 1004, which is configured to send the second-direction position compensation information to a second-direction driving mechanism to allow the second-direction driving mechanism to drive the tightening actuation module to move in the second direction based on the second-direction position compensation information, and to send third-direction position compensation information to a third-direction driving mechanism to allow the third-direction driving mechanism to drive the tightening actuation module to move in the third direction based on the third-direction position compensation information.

The control device according to the forgoing embodiments of the present disclosure can reduce the defective rate of multi-axis synchronous tightening of the tightening apparatus, thereby improving the production efficiency and production quality of products. When the mounting positions of the multiple fasteners change with the product type or product specification, the control device according to the embodiments of the present disclosure can meet the requirement for multi-axis synchronous tightening of the product, has good compatibility, and can thus reduce the service cost of the apparatus.

According to some embodiments of the present disclosure, an electronic apparatus is further provided. The electronic apparatus comprises: at least one processor; and a memory communicatively connected to the at least one processor; wherein the memory stores instructions executable by the at least one processor, and the instructions are executed by the at least one processor to enable the at least one processor to implement the control method applied to a tightening apparatus in the foregoing aspect.

According to some embodiments of the present disclosure, a computer-readable storage medium storing computer instructions is further provided, wherein the computer instructions are configured to enable a computer to implement the control method applied to a tightening apparatus in the foregoing aspect.

According to some embodiments of the present disclosure, a computer program product is further provided. The computer program product comprises a computer program, wherein the computer program, when executed by a processor, implements the control method applied to a tightening apparatus in the foregoing aspect.

On the basis of the beneficial effects of the control method applied to a tightening apparatus according to the foregoing embodiments, the electronic apparatus, the computer-readable storage medium, and the computer program product according to the foregoing embodiments of the present disclosure can also accordingly achieve the following beneficial effects: the defective rate of multi-axis synchronous tightening of the tightening apparatus can be reduced, thereby improving the production efficiency and production quality of products; and when the mounting positions of the multiple fasteners change with the product type or product specification, the tightening apparatus can meet the requirement for multi-axis synchronous tightening of the product, has good compatibility, and can thus reduce the service cost of the apparatus.

Finally, it should be noted that the foregoing embodiments are merely used for illustrating rather than limiting the technical solutions of the present disclosure. Although the present disclosure has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present disclosure, and should fall within the scope of the claims and the specification of the present disclosure. In particular, the technical features mentioned in the embodiments can be combined in any manner, provided that there is no structural conflict. The present disclosure is not limited to the specific embodiments disclosed herein but includes all the technical solutions that fall within the scope of the claims.

What is claimed is:

1. A tightening apparatus, comprising:

a mounting main body and a plurality of tightening mechanisms provided on the mounting main body, wherein each of the tightening mechanisms comprises:

a tightening actuation module, configured to tighten a fastener into a mounting hole along an axis in a first direction;

a visual positioning module, configured to collect image information of the fastener located in the mounting hole, determine positioning information of the fastener based on the image information, and determine second-direction position compensation information and third-direction position compensation information of the tightening actuation module based on the positioning information;

a second-direction driving mechanism, configured to drive the tightening actuation module to move in a second direction based on the second-direction position compensation information; and a third-direction driving mechanism, configured to drive the tightening actuation module to move in a third direction based on the third-direction position compensation information;

wherein the second direction, the third direction and the first direction are perpendicular to each other;

wherein the second-direction driving mechanism comprises:

a first driving device:

a first lead screw extending in the second direction and driven by the first driving device to rotate:

a first guide rail extending in the second direction; and a first slider slidably fitted with the first guide rail and driven by the first lead screw to move in the second direction;

wherein the third-direction driving mechanism is arranged on the first slider and comprises, a second driving device:

a second lead screw extending in the third direction and driven by the second driving device to rotate:

a second guide rail extending in the third direction; and a second slider slidably fitted with the second guide rail and driven by the second lead screw to move in the third direction, wherein the tightening actuation module is arranged on the second slider;

wherein the tightening actuation module comprises:

a mounting base plate fixedly connected to the second slider;

a third driving device fixedly connected to the mounting base plate:

a third guide rail fixedly connected to the mounting base plate and extends in the first direction;

a third slider slidably fitted with the third guide rail and being driven by the third driving device to move in the first direction; and an electric tightening device fixedly connected to the third slider and configured to tighten the fastener into the mounting hole along the axis in the first direction.

2. The tightening apparatus according to claim 1, wherein the second direction is a horizontal direction, the third direction is a horizontal direction, the first direction is a vertical direction, and the image information is high-angle shot image information of the head of the fastener.

3. The tightening apparatus according to claim 1, wherein the first driving device and the second driving device are each a servo motor.

4. The tightening apparatus according to claim 1, wherein the third driving device is a pneumatic cylinder.

5. The tightening apparatus according to claim 1, wherein the electric tightening device comprises:

a main body portion;

a bit; and an insulating adapter, arranged between the main body portion and the bit and fixedly connected to the main body portion and the bit, and isolating the bit from the main body portion in an insulating manner.

6. The tightening apparatus according to claim 5, wherein one end of the insulating adapter is provided with a first insertion hole that extends in the first direction, the insulating adapter is provided with a first pin hole that extends in a radial direction of the first insertion hole and in communication with the first insertion hole, and the main body portion is inserted into the first insertion hole and is fixedly connected to the insulating adapter via a first pin provided in the first pin hole; and the other end of the insulating adapter is provided with a second insertion hole that extends in the first direction, the insulating adapter is provided with a second pin hole that extends in a radial direction of the second insertion hole and in communication with the second insertion hole, and the bit is inserted into the second insertion hole and is fixedly connected to the insulating adapter via a second pin provided in the second pin hole.

7. The tightening apparatus according to claim 6, wherein the first insertion hole and the second insertion hole are each a polygonal insertion hole.

8. The tightening apparatus according to claim 5, wherein the tightening actuation module further comprises:

a supporting component, which is fixedly connected to the mounting base plate and is provided with a positioning hole through which the bit passes.

9. The tightening apparatus according to claim 1, wherein the plurality of tightening mechanisms include four tightening mechanisms, and the tightening actuation modules of the four tightening mechanisms are arranged in a 2×2 matrix.

10. The tightening apparatus according to claim 1, wherein the tightening apparatus further comprises:

a drag chain provided on the mounting main body.

11. The tightening apparatus according to claim 1, wherein the tightening apparatus further comprises:

a mounting flange fixedly connected to the mounting main body; and a carrying apparatus, which is fixedly connected to the mounting flange and is configured to move the tightening apparatus to a target operating position.

12. The tightening apparatus according to claim 11, wherein the carrying apparatus comprises a carrying robot or a gantry.

13. A control method, performed by a control device for the tightening apparatus according to claim 1, comprising:

collecting image information of the fastener located in the mounting hole;

determining positioning information of the fastener based on the image information;

determining second-direction position compensation information and third-direction position compensation information of the tightening actuation module based on the positioning information;

sending the second-direction position compensation information to the second-direction driving mechanism to allow the second-direction driving mechanism to drive the tightening actuation module to move in the second direction based on the second-direction position compensation information; and sending the third-direction position compensation information to the third-direction driving mechanism to allow the third-direction driving mechanism to drive the tightening actuation module to move in the third direction based on the third-direction position compensation information.

14. The control method according to claim 13, wherein the image information is high-angle shot image information of the head of the fastener.

15. A control device for the tightening apparatus of claim 1, comprising:

a collection unit, configured to collect image information of the fastener located in the mounting hole;

a first determination unit, configured to determine positioning information of the fastener based on the image information;

a second determination unit, configured to determine second-direction position compensation information and third-direction position compensation information of the tightening actuation module based on the positioning information; and a sending unit, configured to send the second-direction position compensation information to the second-direction driving mechanism to allow the second-direction driving mechanism to drive the tightening actuation module to move in the second direction based on the second-direction position compensation information, and to send third-direction position compensation information to the third-direction driving mechanism to allow the third-direction driving mechanism to drive the tightening actuation module to move in the third direction based on the third-direction position compensation information.

16. An electronic apparatus, comprising:

at least one processor; and a memory communicatively coupled to the at least one processor, wherein the memory stores instructions executable by the at least one processor, and the instructions are executed by the at least one processor to enable the at least one processor to implement the control method according to claim 13.

17. A non-transitory computer-readable storage medium storing computer instructions, wherein the computer instructions enable a computer to implement the control method according to claim 13.

18. A computer program product, comprising a non-transitory computer-readable medium storing a computer program, wherein the computer program, when executed by a processor, implements the control method according to claim 13.

* * * * *